UNITED STATES PATENT OFFICE.

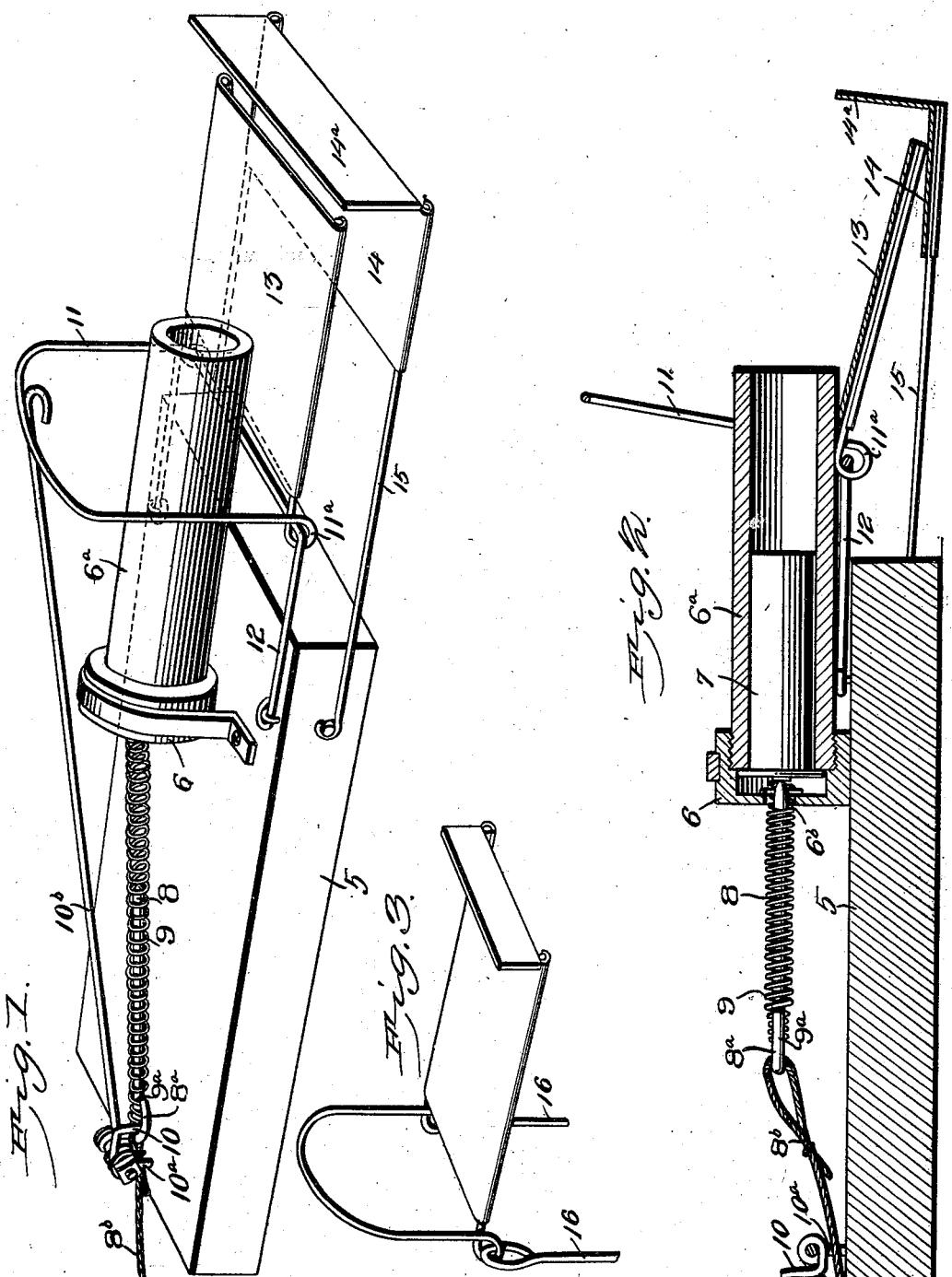

VIRGIL O. HARTER AND WEST H. BROWN, OF RIVERSIDE, CALIFORNIA; SAID BROWN ASSIGNOR TO SAID HARTER.

ANIMAL-TRAP.

SPECIFICATION forming part of Letters Patent No. 723,773, dated March 24, 1903.

Application filed March 24, 1902. Serial No. 99,710. (No model.)

*To all whom it may concern:*

Be it known that we, VIRGIL O. HARTER and WEST H. BROWN, citizens of the United States, residing at Riverside, in the county of Riverside and State of California, have invented a new and useful Animal-Trap, of which the following is a specification.

This invention relates to animal-traps of the class wherein a projectile is caused to be discharged by the action of the animal; and it consists in certain novel features of the construction, as hereinafter shown and described, and specifically pointed out in the claims.

In the drawings illustrative of the invention, Figure 1 is a perspective view of the trap complete with the trap "set." Fig. 2 is a longitudinal sectional elevation with the trap "sprung" or after its action. Fig. 3 is a perspective detail of a modification of the tripping means.

The trap mechanism is supported upon a base 5, preferably of wood and large enough to insure stability and which may be secured to the ground contiguous to the locality where the animal to be destroyed is in the habit of visiting or passing. When employed for destroying gophers and other burrowing animals, the trap will be set near the entrances to their holes or burrows.

Supported upon one end of the base 5 and preferably projecting beyond the end, as shown, is the "gun," formed of a stationary breech-block 6 and detachable "barrel" or tube $6^a$, as shown in Fig. 2. The barrel $6^a$ is preferably adapted to receive and support a cartridge 7 of the form ordinarily employed in shotguns, as shown. The spring 9 might be employed as an impulse-spring to discharge any projectile other than a cartridge, as shown at 7. The firing-pin is represented at 8 and is inclosed by a coiled spring 9, with one end of the spring secured in the breech-block 6 through a central aperture $6^b$ and the other end engaging the firing-pin, as shown at $9^a$. The inner or free end of the firing-pin is rounded to prevent it from catching on the coils of the spring when moving through it. By this means the spring serves the twofold purpose of a means for actuating the firing-pin and a guide to insure its certain action and insuring the proper action on the "cap" of the cartridge. This is an important feature of the invention and obviates the necessity for any support for the firing-pin other than the spring.

Mounted upon the rear of the base 5 is a trigger-releasing mechanism consisting of a finger or pawl 10, pivotally supported by a standard $10^a$ and having a long arm $10^b$ extending forward over the gun portion of the device and engaging a trigger-loop 11, arching over the barrel 6 and flexibly connected by its lower ends or legs at $11^a$ to a wire frame 12, connected to the base 5. The loop 11 is extended horizontally at its lower part and provided with a plate 13, which projects beneath the muzzle of the barrel 7, as shown. The rear end of the firing-pin 8 is formed with an eye $8^a$, adapted to engage the finger 10, as shown in Fig. 1. A cord $8^b$ is attached to the firing-pin 8 and carried rearwardly over the end of the base to afford means for drawing the firing-pin backward and engaging it with the depending trip finger or pin 10. A stud $5^a$ will be inserted in the rear end of the base 5, around which the cord may be wound to assist in holding the firing-pin while being engaged by the finger 10. The outer end of the arm $10^b$ engages the under side of the loop 11, as shown in Fig. 1, so that when the parts are adjusted as shown in Fig. 1 the finger 10 will retain the firing-pin in its backward position, with the spring distended and ready for action. Then any downward movement of the plate 13 will withdraw the loop 11 from engagement with the arm $10^b$ and release the spring and permit it to cause the firing-pin to discharge the cartridge 7. Thus any animal which engages the plate 13, and thereby comes into the firing-line of the cartridge, will be destroyed. When employed for destroying gophers or other burrowing animals, the trap will be set with the plate 13 over the entrance to the burrow, so that any attempt of the animal to enter his burrow or to throw earth therein will result in "springing" the trap. To guard against the animal crowding earth beneath the plate 13, and thus preventing it from being depressed, a supplemental plate 14 is arranged beneath the plate 13 with its outer end turned upward, as at 14ª, the plate 14 being rigidly connected to the base 5, as by bars 15. When employed for destroying squirrels and similar animals, suitable bait—such as nuts, corn, or the like—will be placed upon the plate 13, so that any attempt at its removal will cause the animal to depress the plate and spring the trap.

Instead of attaching the plate 13 to the base 5, as shown in Figs. 1 and 2, it may be provided with depending rods 16, as shown in Fig. 3, adapted to be forced into the ground to support the plate; but this would be a mere modification, which would not affect the operation or be a departure from the scope or spirit of the invention.

The proportions and relative arrangement of the parts may be modified and changed in minor details without departing from the scope and spirit of the invention, and we do not, therefore, desire to be limited to the precise proportions of the construction shown.

The trap may be made of any size to adapt it to the destruction of different species of animals.

What is claimed is—

1. In an animal-trap, a supporting-base, a tube mounted upon said base, and adapted to contain a firing charge, a coiled spring engaging an aperture in the rear end of said tube by one end, a firing-pin inclosed by said spring and connected by its outer end to the outer end of said spring, a trigger means disposed to support said spring distended, and a tripping mechanism adapted to release said firing-pin, substantially as described.

2. In an animal-trap, a supporting-base, a breech-block secured upon said base and having an aperture in the rear thereof, a tube removably connected to said breech-block, and adapted to support a cartridge, a coiled spring secured by one end in said aperture, a firing-pin within said coiled spring and connected by its outer end to the outer end of said spring, a trigger means disposed to support said spring distended, and a tripping means adapted to release said trigger means, substantially as described.

In testimony that we claim the foregoing as our own we have hereto affixed our signatures in the presence of two witnesses.

VIRGIL O. HARTER.
WEST H. BROWN.

Witnesses:
J. RAMSBOTTOM,
CHAS. E. WILBUR.